P. W. PALM.
RUNNER ATTACHMENT FOR MOTOR VEHICLES.
APPLICATION FILED JUNE 24, 1920.
1,404,052.
Patented Jan. 17, 1922.
2 SHEETS—SHEET 1.
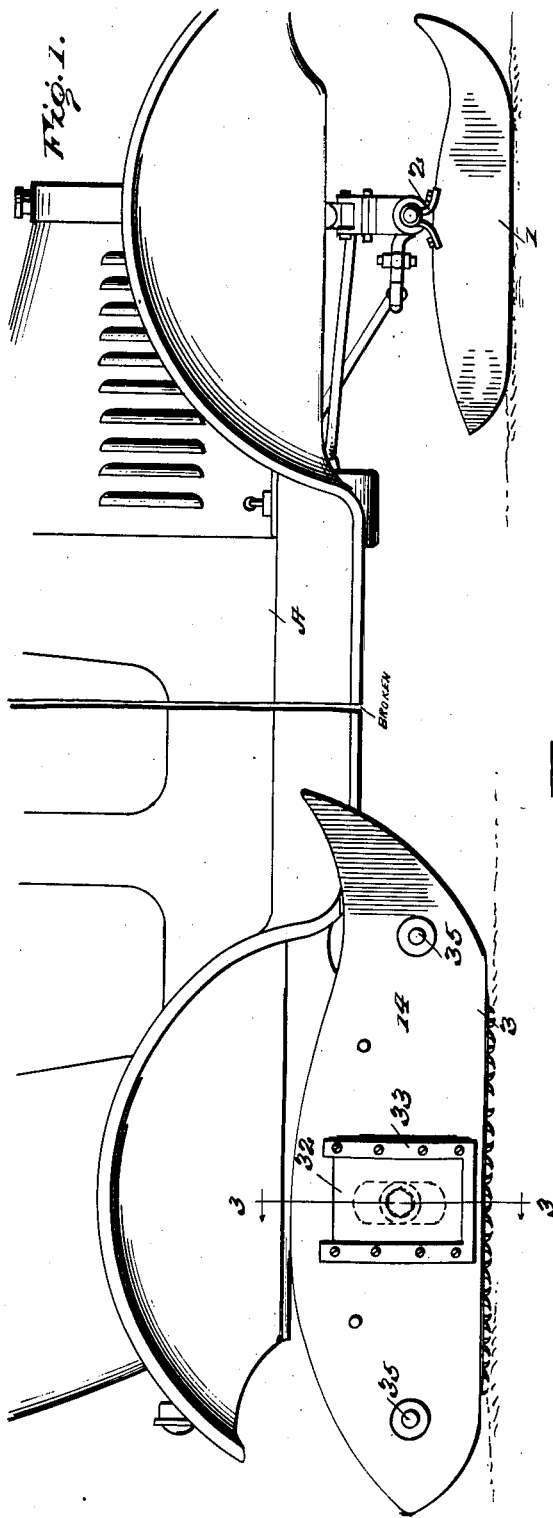
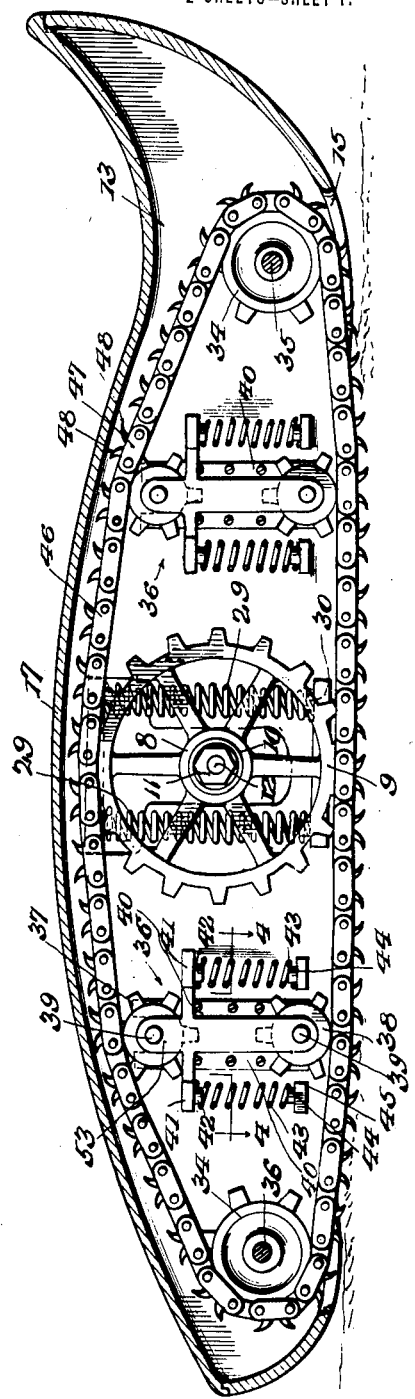
Inventor
P. W. Palm.
Lacy & Lacy,

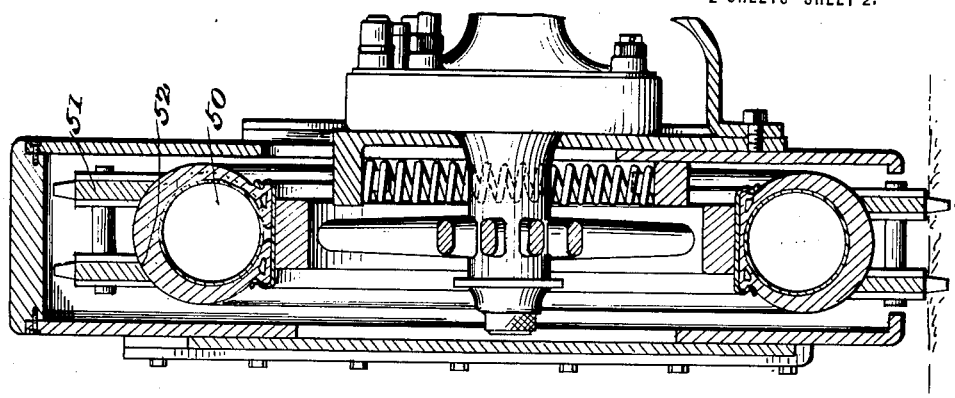

UNITED STATES PATENT OFFICE.

PER W. PALM, OF BAUDETTE, MINNESOTA.

RUNNER ATTACHMENT FOR MOTOR VEHICLES.

1,404,052.  Specification of Letters Patent.  Patented Jan. 17, 1922.

Application filed June 24, 1920. Serial No. 391,381.

*To all whom it may concern:*

Be it known that I, PER W. PALM, citizen of the United States, residing at Baudette, in the county of Beltrami and State of Minnesota, have invented certain new and useful Improvements in Runner Attachments for Motor Vehicles, of which the following is a specification.

This invention relates to runner attachments for vehicles and provides an attachment of that class wherein traction means are provided within runner housings for engagement with the ground for driving the vehicle.

It is an object of the present invention to provide a runner of the endless tractor type in which the weight of the vehicle is compensated for in the elements forming the idling means for the tractor element.

The invention also has as an object the provision of a runner of the endless tractor type which may be easily adapted to the usual motor vehicle.

A further object of the invention resides in so constructing the attachment that substantially all of the weight of the vehicle rests on the runner housing for the tractor element.

In the drawings:

Figure 1 is a side elevation of a motor vehicle equipped with my invention.

Figure 2 is a longitudinal vertical section through the rear runner.

Figure 3 is a section on the line 3—3 of Figure 1.

Figure 4 is a section on the line 4—4 of Figure 2.

Figure 5 is a section similar to Figure 3, through a modified form of the invention.

In detail:

The invention is shown in Figure 1 as applied to the usual motor vehicle A and, depending upon the proportioning of the attachment, the fenders and running board may be removed or not, as required. The forward runners 1 are of the usual sled-like form and carry brackets 2 which replace the hubs of the usual wheels. The rear runners are designated as a whole at 3 and also replace the usual wheels.

Since both rear runners are the same, except for being right and left handed, it will be necessary to describe only one. The rear axle of the vehicle is indicated at 4 and has the usual brake drum 5 and its attendant mechanism. The axle spindle 6 provided with a key 7, receives the hub 8 of a sprocket 9 which replaces the usual driving wheel of the vehicle and is secured in place by the washer 10 and nut 11 threaded on the end 12 of the axle spindle 6. A runner housing consisting of halves 13 and 14 having ground engaging surfaces 15 and 16 respectively, is secured together by the cover casting 17 shouldered as at 18 and fastened by bolts 19. The inside half 13 is apertured as at 20 to admit the hub of the sprocket 9 and its attendant drum and said hub rests in an opening in a vertically slidable plate 25 moving in guideways 26 on the half 13 and which plate 25 carries an abutment 27 at its upper end, said abutment having pins 28 entering springs 29 which at their lower ends are seated against a fixed support 30 so that the weight of the vehicle acts to yieldably hold the runner or housing to the ground.

A brace 21 is secured to the axle casing by clips 22 and is bolted to the slide 25 below the brake drum, the weight of the vehicle being carried by the sprocket 9 and creating the tractive force.

The outer half 14 of the housing is made substantially plain except for an opening 31 which permits of ready access to the sprocket 9 and its fastening means. The opening 31 is closed by a slide plate 32 carried in guides 33 as shown. Within the interior of the runner housing at approximately each end thereof, is a fixed idler sprocket 34 mounted on stud shafts 35 carried in the halves 13 and 14 of the runner housing.

Intermediate of the idler sprockets 34 and the sprocket 9 are mounted the yieldable idler mechanisms indicated as a whole at 36 and each of which consists of two superposed sprockets 37 and 38 having spindles 39 guided in the vertical guideways 40 mounted on the halves 13 and 14 of the runner housing, the spindles being connected by a link 53. Projecting from the link 53 are the arms 41 having pins 42 received in the ends of springs 43 which, at their lower ends, are received on pins 44 of abutments 45 provided on the housing. This construction, as will be seen, provides a resilient or yieldable sprocket idler mechanism for receiving jolts and jars imparted to the ground flight of the tractor tread, thus taking the strain off the main sprocket 9 and at the same time tends to hold up the upper run of the traction chain and thereby exert a pull on the lower flight of the chain which will aid in keeping it in condition for exerting the required traction.

If desirable, a tractor chain of special form may be provided such as I have shown in Figure 2, wherein the links, as indicated at 47, are each provided with reversely directed ground-engaging lugs 48, so that equal traction is provided in either direction of movement of the chain.

In Figure 5, is shown a modification in which the usual pneumatic tired wheel 50 of the vehicle is used and receives a tractor chain 51, the base of the links of which are formed concave as indicated at 52 so as to be received by the tread portion of the pneumatic tired wheel. The idlers and other mechanism associated with the runner housing are substantially identical with those described in connection with the previous form of the invention.

I do not limit myself to the exact details shown in the drawings as various changes may be made therein without departing from the spirit of the invention as the same is defined in the accompanying claims. For instance, the springs 29 may be disposed outside the runner housing instead of inside the same.

The springs 29 serve to cushion the jars due to travel over a rough surface while maintaining the tractive engagement between the ground and the traction member through the sprocket 9.

I claim:

1. The combination with a motor vehicle, of runner supports therefor including a housing having a vertical slot in its inner wall to receive the driving axle of the vehicle, a driving member on said axle within the housing, a cover plate for said slot connected with the axle and engaging said driving member, said cover plate being slidably mounted on the housing, a lower abutment on the housing, an upper abutment on the cover plate, an expansible spring disposed between said abutments, idlers within the ends of the housing, and an endless traction element trained around said idlers and the driving member on the axle of the vehicle.

2. The combination with a motor vehicle, of runner supports therefor including a housing receiving the driving axle of the vehicle, a driving member on said axle within the housing, a yieldable support for said axle and driving member slidably mounted on the housing, idlers in the ends of the housing, an endless traction element trained around the idlers and the driving member on the axle of the vehicle, idlers engaging the traction element between the first-mentioned idlers and the axle of the vehicle, links carrying said second-mentioned idlers and having lateral abutments near their upper ends, lower abutments on the housing, and expansible springs between said abutments.

In testimony whereof I affix my signature.

PER W. PALM. [L. S.]